United States Patent
Lloyd et al.

(10) Patent No.: US 11,017,548 B2
(45) Date of Patent: May 25, 2021

(54) METHODS, SYSTEMS, AND APPARATUSES FOR COMPUTING DIMENSIONS OF AN OBJECT USING RANGE IMAGES

(71) Applicant: Hand Held Products, Inc., Fort Mill, SC (US)

(72) Inventors: Ryan Andrew Lloyd, Plymouth, MN (US); Scott McCloskey, Minneapolis, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 158 days.

(21) Appl. No.: 16/014,851

(22) Filed: Jun. 21, 2018

(65) Prior Publication Data

US 2019/0392602 A1 Dec. 26, 2019

(51) Int. Cl.
*G06T 7/33* (2017.01)
*G06T 7/62* (2017.01)
*G06T 7/73* (2017.01)
*G06T 7/246* (2017.01)

(52) U.S. Cl.
CPC ............... *G06T 7/62* (2017.01); *G06T 7/248* (2017.01); *G06T 7/73* (2017.01); *G06T 2207/10016* (2013.01); *G06T 2207/10028* (2013.01)

(58) Field of Classification Search
CPC combination set(s) only.
See application file for complete search history.

(56) References Cited

U.S. PATENT DOCUMENTS

| | | | |
|---|---|---|---|
| 7,343,278 B2 | 3/2008 | Billinghurst et al. | |
| 8,953,024 B2 | 2/2015 | Wang et al. | |
| 9,600,892 B2 | 3/2017 | Patel et al. | |
| 9,940,727 B2 * | 4/2018 | Medioni | G06T 7/0075 |
| 2007/0236514 A1 * | 10/2007 | Agusanto | A61B 34/20 345/646 |
| 2010/0074532 A1 * | 3/2010 | Gordon | G01B 11/25 382/203 |

(Continued)

FOREIGN PATENT DOCUMENTS

CN 107462152 A 12/2017

OTHER PUBLICATIONS

Extended European Search Report for Application No. 19180130.7, dated Nov. 6, 2019, 9 pages.

(Continued)

*Primary Examiner* — Cindy Trandai
(74) *Attorney, Agent, or Firm* — Alston & Bird LLP

(57) ABSTRACT

Various embodiments described herein relate to techniques for computing dimensions of an object using multiple range images. In this aspect, the multiple range images are captured from selective locations and satisfy a pre-defined criterion. In accordance with various embodiments, at least a pair of 3D points are identified from the multiple range images, which correspond to at least one geometric feature on a surface of the object. In this regard, a correspondence score is estimated for the identified at least one pair of 3D points. The correspondence score is then utilized for registering the at least one pair of 3D points. Based in part on the registration of the 3D points and 3D point clouds retrieved from the captured images, the dimensions of the object are computed.

20 Claims, 10 Drawing Sheets

(56) References Cited

U.S. PATENT DOCUMENTS

| | | | |
|---|---|---|---|
| 2013/0322698 A1* | 12/2013 | Moden | G06T 7/285 |
| | | | 382/107 |
| 2014/0104416 A1 | 4/2014 | Giordano et al. | |
| 2015/0009214 A1* | 1/2015 | Lee | G06T 17/20 |
| | | | 345/420 |
| 2015/0029182 A1* | 1/2015 | Sun | G06T 19/003 |
| | | | 345/419 |
| 2015/0170378 A1 | 6/2015 | Moran et al. | |
| 2015/0279083 A1 | 10/2015 | Pradeep et al. | |
| 2015/0317821 A1* | 11/2015 | Ding | G06T 15/10 |
| | | | 345/420 |
| 2016/0063754 A1* | 3/2016 | Korchev | G06T 15/08 |
| | | | 345/424 |
| 2016/0104274 A1 | 4/2016 | Jovanovski et al. | |
| 2016/0109219 A1 | 4/2016 | Ackley et al. | |
| 2016/0109220 A1 | 4/2016 | Laffargue et al. | |
| 2016/0112631 A1 | 4/2016 | Ackley et al. | |
| 2016/0112643 A1 | 4/2016 | Laffargue et al. | |
| 2016/0343176 A1 | 11/2016 | Ackley | |
| 2016/0370220 A1 | 12/2016 | Ackley et al. | |
| 2017/0010141 A1 | 1/2017 | Ackley | |
| 2017/0091706 A1 | 3/2017 | Lloyd et al. | |
| 2017/0128737 A1* | 5/2017 | Yasumuro | G01S 17/89 |
| 2017/0185823 A1* | 6/2017 | Gold | G06F 16/5838 |
| 2017/0230639 A1 | 8/2017 | Laffargue et al. | |
| 2017/0351891 A1 | 12/2017 | Ackley et al. | |
| 2017/0358098 A1 | 12/2017 | Lloyd et al. | |
| 2017/0365060 A1 | 12/2017 | Ackley | |
| 2017/0372489 A1 | 12/2017 | Tabuchi et al. | |
| 2018/0033214 A1 | 2/2018 | Ackley | |
| 2018/0037412 A1 | 2/2018 | Lynch et al. | |
| 2018/0052027 A1 | 2/2018 | Ackley | |
| 2018/0075618 A1 | 3/2018 | Lai et al. | |
| 2018/0165824 A1 | 6/2018 | Ackley et al. | |
| 2018/0350073 A1* | 12/2018 | Shokri | G06T 7/60 |
| 2019/0005670 A1* | 1/2019 | DeTone | G06T 7/593 |
| 2019/0180467 A1* | 6/2019 | Li | G06K 9/6289 |
| 2019/0279390 A1* | 9/2019 | Zavesky | G06T 7/70 |

OTHER PUBLICATIONS

Communication Pursuant to Article 94(3) issued in European Application No. 19180130.7 dated Feb. 22, 2021, 6 pages.

* cited by examiner

METHODS, SYSTEMS, AND APPARATUSES FOR COMPUTING DIMENSIONS OF AN OBJECT USING RANGE IMAGES

BACKGROUND

Generally, in material handling environments such as, but not limited to, warehouses, inventories, distribution and shipping centers etc., measuring dimensions of a pallet or a package that is intended for shipping is often required. Applicant has identified a number of deficiencies and problems associated with conventional methods. Through applied effort, ingenuity, and innovation, many of these identified problems have been solved by developing solutions that are included in embodiments of the present disclosure, many examples of which are described in detail herein.

BRIEF SUMMARY

Various embodiments of the present disclosure relate generally to a dimensioning system that uses image processing techniques to measure a physical size of an object and, more particularly, to methods, systems, and apparatuses that compute dimensions of objects using range images captured from selective viewpoints.

In accordance with various example embodiments described herein, a method is provided. The method comprises receiving, by a processing unit of a dimensioning system, a plurality of image frames corresponding to an object from a plurality of locations, wherein two or more image frames of the plurality of image frames are associated with at least two locations of the plurality of locations and satisfy a predefined criterion associated with a geometric feature on a surface of the object; retrieving, by the processing unit, a plurality of 3D point clouds from the plurality of image frames, wherein the plurality of 3D point clouds comprise a plurality of 3D points; identifying, by the processing unit, at least one pair of 3D points from the plurality of 3D points, wherein each 3D point of the at least one pair of 3D points corresponds to the geometric feature on the surface of the object; estimating, by the processing unit, a correspondence score for the at least one pair of 3D points based upon one or more movement parameters associated with the dimensioning system; registering, by the processing unit, coordinates corresponding to each 3D point of the at least one pair of 3D points based upon the correspondence score; and computing, by the processing unit, dimensions of the object based at least in part upon the registered coordinates of the each 3D point of the at least one pair of the 3D points and the plurality of 3D point clouds retrieved from the plurality of image frames.

In accordance with various embodiments described herein, the at least one pair of 3D points comprises 3D points from at least two 3D point clouds of the plurality of 3D point clouds, wherein the at least two 3D point clouds are associated with the two or more image frames.

In accordance with various embodiments described herein, the geometric feature comprises at least one edge of the object for which at least two surfaces of the object are mutually orthogonal, wherein the two or more image frames satisfy the predefined criterion by having the at least one edge on their corresponding image frames.

In accordance with various embodiments described herein, the one or more movement parameters comprise one or more distances travelled by a camera unit for capturing the plurality of image frames.

In accordance with various embodiments described herein, the one or more movement parameters comprise one or more angular orientation parameters identified from each 3D point from the plurality of 3D points, wherein the one or more angular orientation parameters comprise at least one of a pitch, a yaw, or a roll of a camera unit for capturing the plurality of image frames.

In accordance with various embodiments described herein, the computing the dimensions of the object comprises retrieving, by the processing unit, coordinates of a reference plane utilized by the dimensioning system for capturing the plurality of image frames including the set of 3D points at the plurality of locations; and computing, by the processing unit, the dimensions of the object based upon the registered coordinates of the each of the identified at least one pair of the 3D point and the retrieved coordinates of the reference plane.

In accordance with various embodiments described herein, the method further comprises determining the plurality of image frames from a video feed associated with the object. In some embodiments, determining the plurality of image frames further comprises identifying the two or more image frames associated the at least two locations from the video feed.

In accordance with various embodiments described herein, the method further comprises determining the at least one location based on the two or more image frames; and subsequent to determining the at least one location and prior to retrieving the plurality of 3D point clouds, generating navigational commands directing to the at least one location.

In accordance with various embodiments described herein, determining the at least two locations from the two or more image frames comprises identifying at least one movement parameter associated the dimensioning system from the two or more image frames.

In accordance with various embodiments described herein, the navigational commands are in form of at least one of a text message, a voice based instruction, and/or a haptic feedback.

In accordance with various embodiments described herein, a system for determining dimensions of an object is provided. The system comprises a camera unit configured to capture a plurality of image frames of the object from a plurality of locations, wherein two or more image frames of the plurality of image frames are associated with at least two locations of the plurality of locations and satisfy a predefined criterion associated with a geometric feature on a surface of the object; a processing unit in electronic communication with the camera unit, wherein the processing unit is configured to: receive, from the camera unit, the plurality of image frames; retrieve a plurality of 3D point clouds from the plurality of image frames, wherein the plurality of 3D point clouds comprise a plurality of 3D points; identify at least one pair of 3D points from the plurality of 3D points, wherein each 3D point of the at least one pair of 3D points corresponds to the geometric feature on the surface of the object; estimate a correspondence score for the at least one pair of 3D points based upon one or more movement parameters associated with the camera unit; register coordinates corresponding to each 3D point of the at least one pair of 3D points based upon the correspondence score; and compute dimensions of the object based at least in part upon the registered coordinates of each 3D point of the at least one pair of the 3D point and the plurality of 3D point clouds retrieved from the plurality of image frames.

In accordance with various embodiments described herein, the one or more movement parameters comprise at least one of: (a) one or more distances travelled by the camera unit for capturing the plurality of image frames; or (b) one or more angular orientation parameters identified from each 3D point from the plurality of 3D points, wherein the one or more angular orientation parameters comprise at least one of a pitch, a yaw, or a roll of the camera unit for capturing the plurality of image frames.

In accordance with various embodiments described herein, an apparatus for computing dimensions of an object using a plurality of image frames is provided. The apparatus comprises at least one processor and at least one non-transitory memory including program code. The at least one non-transitory memory and the program code are configured to, with the at least one processor, cause the apparatus to at least: receive the plurality of image frames corresponding to the object from a plurality of locations, wherein two or more image frames of the plurality of image frames are associated with at least two locations of the plurality of locations and satisfy a predefined criterion associated with a geometric feature on a surface of the object; retrieve a plurality of 3D point clouds from the plurality of image frames, wherein the plurality of 3D point clouds comprise a plurality of 3D points; identify at least one pair of 3D points from the plurality of 3D points, wherein each 3D point of the at least one pair of 3D points corresponds to the geometric feature on a surface of the object; estimate a correspondence score for the at least one pair of 3D points based upon one or more movement parameters associated with a camera unit for capturing the plurality of image frames; register coordinates corresponding to each 3D point of the at least one pair of 3D points based upon the correspondence score; and compute dimensions of the object based at least in part upon the registered coordinates of each 3D point of the at least one pair of the 3D point and the plurality of 3D point clouds retrieved from the plurality of image frames.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
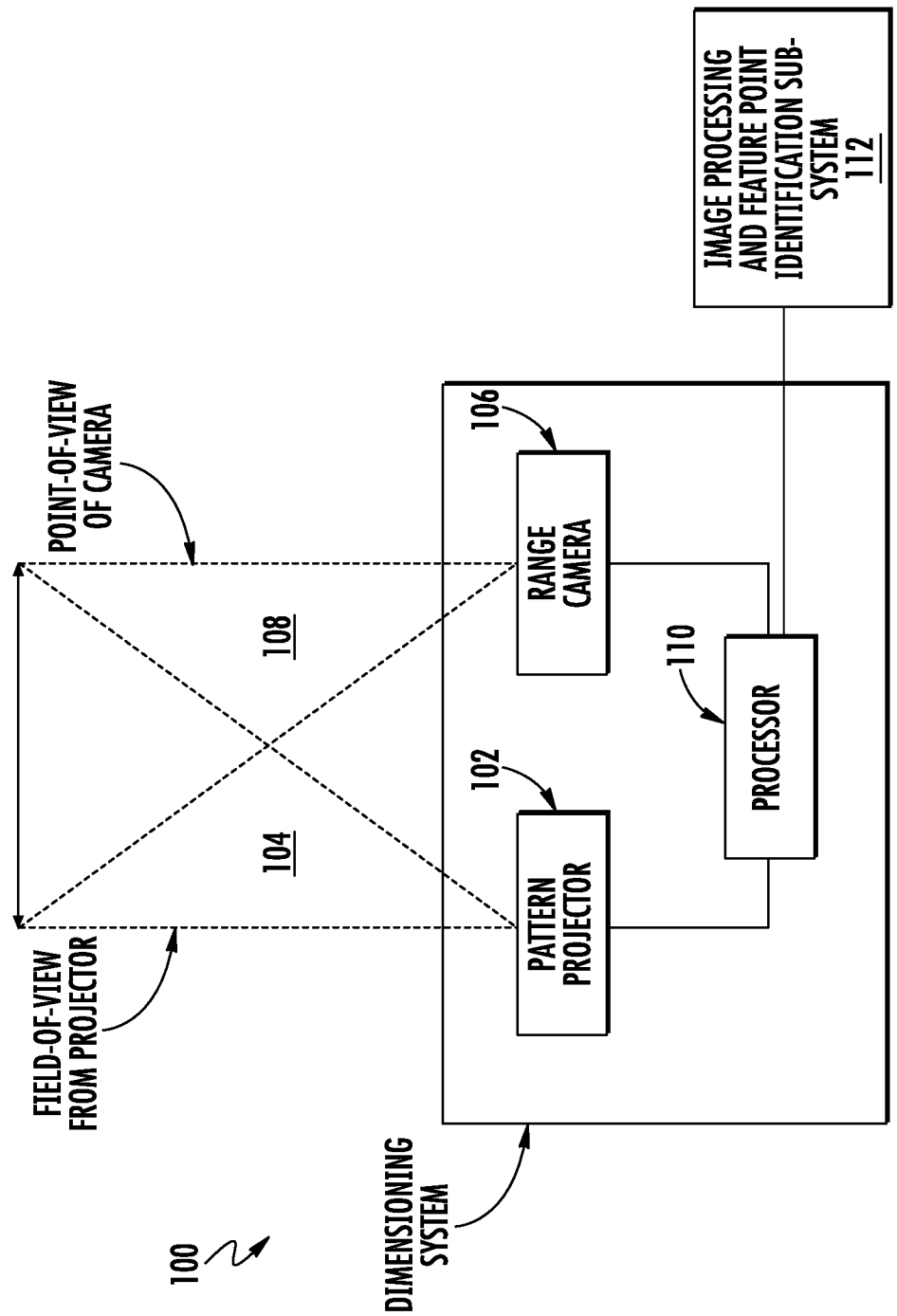
FIG. 1 schematically depicts a block diagram of a dimensioning system, in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In material handling environments, cost to ship a package is historically been computed based on dimensions of the package. Volume dimensioning devices (i.e. dimensioners) are devices that are used for estimating sizes of items (such as boxes). In some scenarios, a dimensioner may be a large device that is a static part of a logistical system in a distribution center or warehouse. A dimensioner is an electronic device configured to obtain optically-sensed characteristics of an object, such as a pallet or a package to be shipped, as well as distance calculations from the dimensioner itself to various parts of the object. Based on this information, the dimensioner calculates volumetric dimensions of the package. In this aspect, when used with a conveyor system, some dimensioners are capable of calculating the volume of dozens of packages per minute. In such material handling environments where items or packages of different sizes are to be processed at a large scale, dimensioners provide a fast way to calculate the dimensions of the multiple packages. It is often desired to achieve faster processing speed of the dimensioners to increase overall productivity of the material handling environment.

Volume dimensioners may estimate dimensions of objects by performing 3D scanning of the objects from multiple viewing angles, which involves capturing multiple images of the object from different viewing angles. In this regard, the captured images (each of which corresponds to a 3D point cloud) may be stitched together, and further processing is performed on the stitched image to provide a cohesive 3D representation of the object. From the 3D representation of the object, dimensions of the object are estimated by the dimensioner.

However, in situations where a size of the object to be dimensioned is large (such as big sized boxes or containers meant for shipping), it is often required to move a dimensioner to different viewing angles and capture a large number of images, as these objects cannot be 3D scanned completely by only capturing few images. In such cases, the large number of captured images must be stored in a dimensioner's memory, which occupies significant memory storage. Further, in such implementations, each of the captured image is to be retrieved from the memory and processed by a processor of the volume dimensioner to create the 3D representation, thereby requiring significant processing time and delay in estimation of dimensions of the object.

Further, due to the large number of images to be captured and to maintain processing time within limits, the camera unit of the dimensioner must be moved quickly around the object. Thus, in such cases, these images are captured at a high rate with short camera exposure time, which is further error-prone and leads to false image registration, creating a stitched point cloud which appears cluttered and messy for computing the dimensions accurately. Estimating dimensions of the object from such cluttered point clouds is challenging and involves significant time, thereby leading to lower dimensioner throughput rate of computing dimensions of the objects.

Various embodiments described herein illustrate techniques for computing dimensions of an object without the need of "3D image stitching." Instead, various embodiments of the present invention capture dimensions by capturing and processing a significantly lesser number of range images of the object. In accordance with various embodiments described herein, a method for computing the dimensions of the object includes capturing multiple image frames of an object from different locations, which are selected based on satisfying a pre-determined criterion. In this aspect, two or more locations from the different locations are selected as satisfying the pre-determined criterion when the image frames captured at these two or more locations include at least a pair of 3D points corresponding to a geometric feature (such as an edge of the object where at least two planar surfaces of the object are mutually orthogonal). Here, a 3D point represents three-dimensional coordinates of a point on a surface of the object, which is captured in an image frame by the camera unit of the dimensioning system. Accordingly, multiple such 3D points are identified from the captured image frames, which includes retrieving multiple 3D point clouds from each of the captured image frames and obtaining a plurality of 3D points from the multiple 3D point clouds. In this aspect, an identification of at least one pair of 3D points from the sets of 3D points is performed, such that each 3D point from the at least one pair of 3D point corresponds to a geometric feature on a surface of the object. In this regard, the 3D points corresponding to a geometric feature are those points which have distinguishing characteristics on the surface of the object, such as corners, edges (as described above), interest points, blobs etc. In accordance with various embodiments described herein, these identified at least one pair of 3D points are thereafter used for estimating a correspondence score and computing dimensions of the object.

Having described an example embodiment at a high level, the design of the various devices performing various example operations is provided below.

FIG. 1 illustrates an exemplary dimensioning system 100 adapted to compute dimensions of an object using range images in accordance with various embodiments described herein. As illustrated, the dimensioning system 100 includes a pattern projector 102 which may be configured to project a light pattern (e.g., infrared light) into a field-of-view 104. In this aspect, the light pattern typically comprises points of light arranged in a pattern (i.e., point cloud). In accordance with various embodiments described herein, the points of light may be (i) sized identically or differently and (ii) may be arranged in some order or pseudo-randomly. In an aspect, the pattern projector 102 may create the light pattern using a light source (e.g., laser, LED, etc.), a pattern creator (e.g., a mask, a diffractive optical element, etc.), and one or more lenses. As illustrated, the dimensioning system 100 also includes a range camera 106 configured to capture an image of the projected light pattern that is reflected from the range camera's field-of-view 108. In this aspect, in accordance with various embodiments described herein, the light pattern may be projected on an object by the pattern projector 102, and the range camera 106 may capture a 2D image of the object along with the reflected project pattern from the object. Illustratively, the field-of-view 108 of the range camera 106 and the field-of-view 104 of the pattern projector 102 should overlap, but may not necessarily have identical shapes/sizes. In this aspect, the range camera 106 may include one or more lenses to form a real image of the field-of-view 108 onto an image sensor. In this regard, an image sensor (e.g., CMOS sensor, CCD sensor, etc.) may be used to create a digital image of the light pattern. The range camera 106 may also include the necessary processing component(s) (e.g. DSP, FPGA, ASIC, etc.) to obtain 3D data from the light pattern image.

In accordance with various embodiments described herein, light filtering (e.g., infrared filter) may also be used to help detect the reflected pattern by removing stray light and/or ambient light. As a non-limiting example, the range camera 106 may be based on one or more of: structured light, stereo vision, time-of-flight, the like, and/or combinations thereof. As illustrated, the dimensioning system 100 includes a processor 110, communicatively coupled to the pattern projector 102 and the range camera 106, and an image processing and feature point identification sub-system 112, which is adapted to identify 3D points from the 2D images captured by the range camera 106. As described above, the 3D points may correspond to a geometric feature of the object for computing dimensions of the object.

Figure 2:
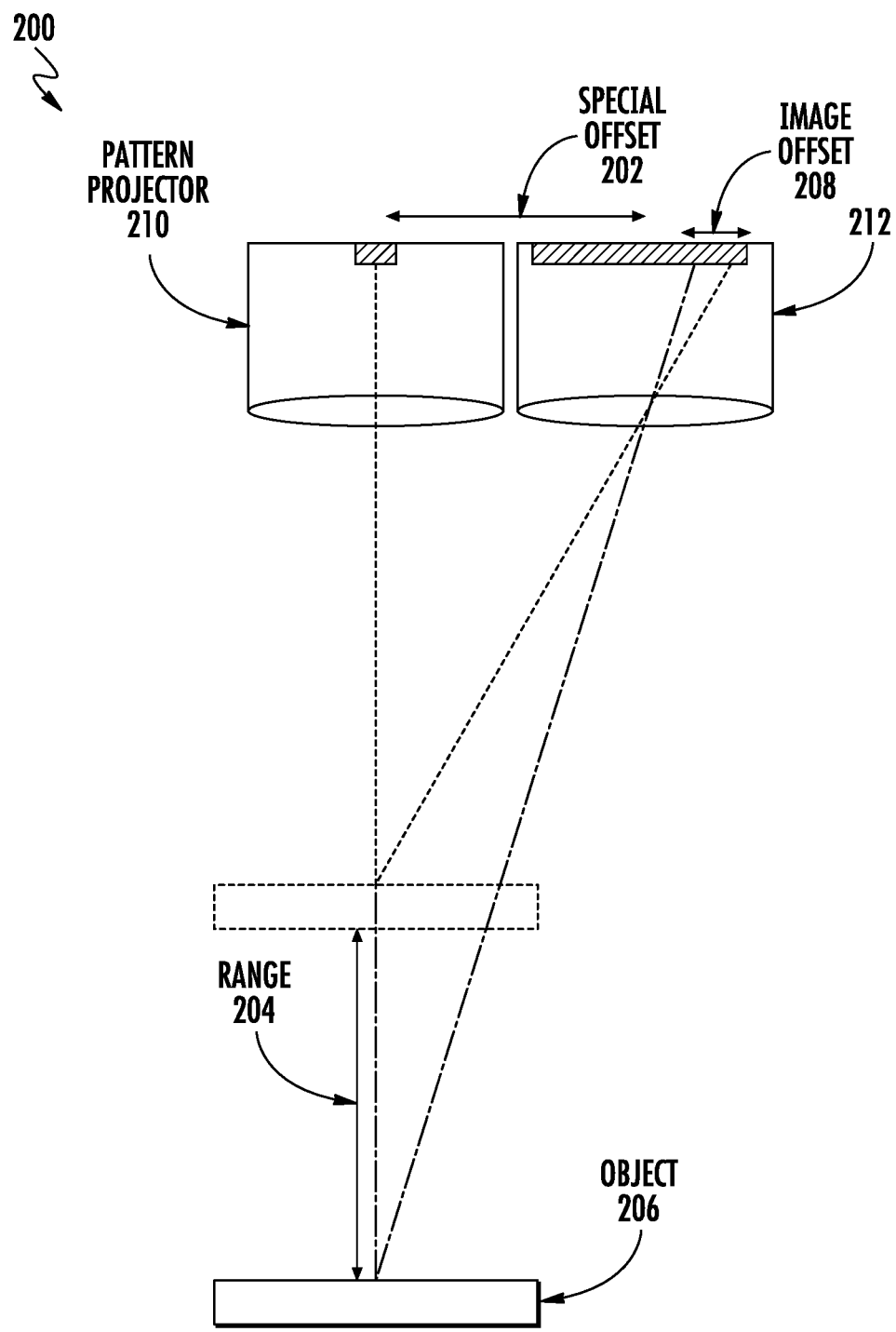
FIG. 2 graphically depicts a diagram illustrating sensing three dimensions of an object using a spatially offset pattern projector and a range camera, in accordance with some example embodiments described herein.

FIG. 2 graphically depicts sensing three dimensions (3D) using a spatially offset pattern projector, such as the pattern projector 102 and the range camera 106 of FIG. 1, in accordance with some example embodiments described herein. In this aspect, FIG. 2 illustrates an exemplary technique for retrieving multiple 3D point clouds from multiple image frames, including the projected pattern of an object 206 as captured by the range camera 212. As shown in FIG. 2, the pattern projector 210 and the range camera 212 may be spatially offset (e.g., stereoscopically arranged). In this regard, the spatial offset 202 allows for changes in the range 204 of an object 206 to be detected as an image offset 208 on the range camera's image sensor. In accordance with various embodiments described herein, the spatial offset 202 may be adjusted to change the image offset 208, which changes the resolution at which range differences 204 may be detected. In this way, image offsets in a point-cloud pattern detected by the range camera 212 may be converted into 3D data for objects within the dimensioning system's field-of-view. In this regard, the 3D data includes range values for each point of light in the point-cloud image sensed by the range camera's 212 image sensors. Further, range values between the points of light in the point-cloud image may be interpolated to create a range image. In this regard, a range image is a gray scale image, in which each pixel value in the image corresponds to an estimated range between the dimensioning system and a point in the field-of-view. Thus, in accordance with various embodiments described herein, in operation, the range camera 212 may output 3D data in the form of point-cloud images or range images.

Figure 3:
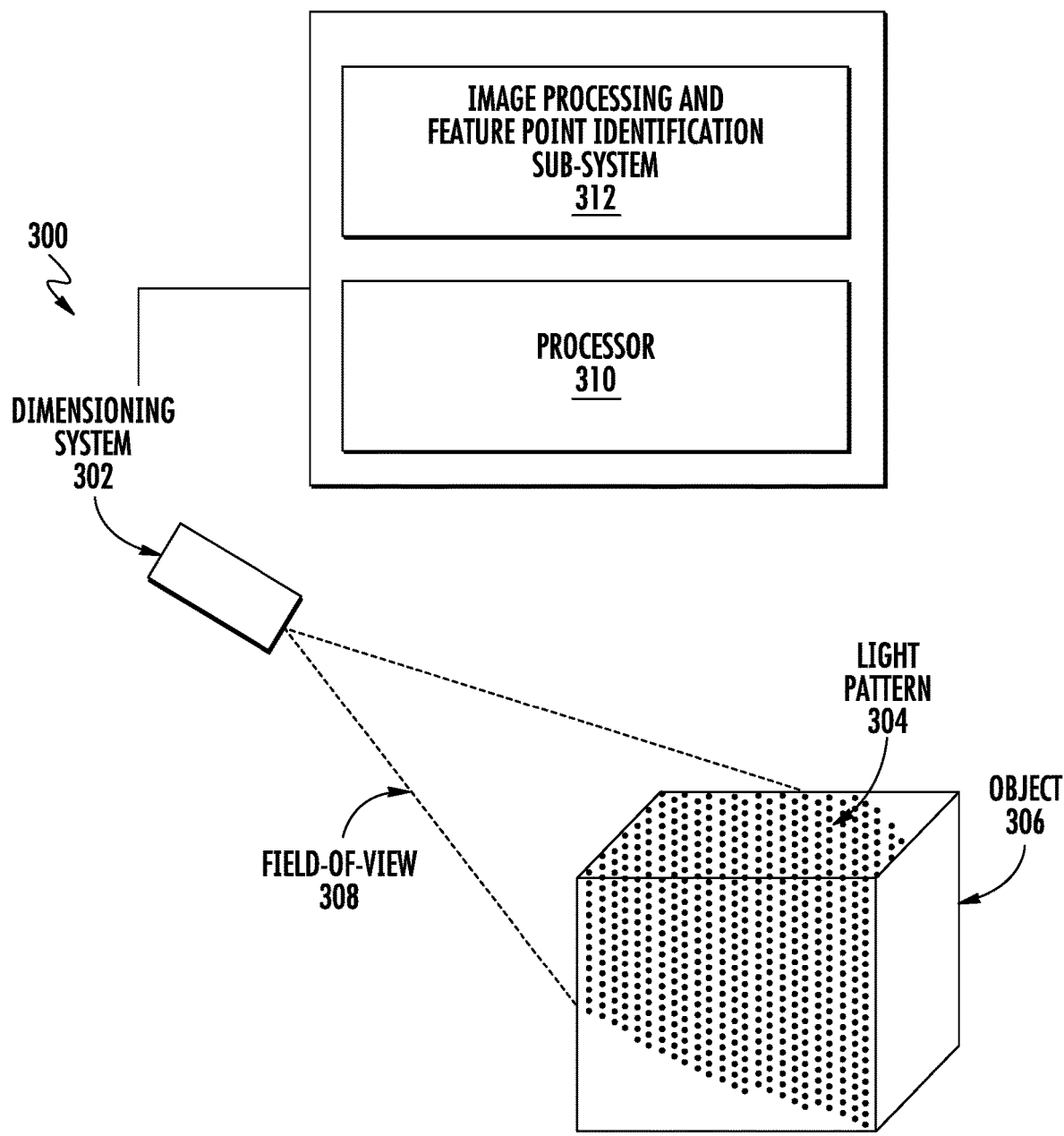
FIG. 3 illustrates an example implementation of a dimensioning system's pattern projector of the dimensioning system, in accordance with some example embodiments described herein.

FIG. 3 graphically depicts a dimensioning system 300, including an object dimensioner 302 which projects a light pattern 304 onto an object 306 in a field-of-view 308 of the dimensioner 302. This depiction shows the dimensioning system 300 capturing a single view of object 306. As illustrated, the dimensioning system 300 includes the processor 310 and the image processing and feature point identification sub-system 312 for computing the dimensions of the object using range images as described in accordance with various embodiments herein.

Figure 4:
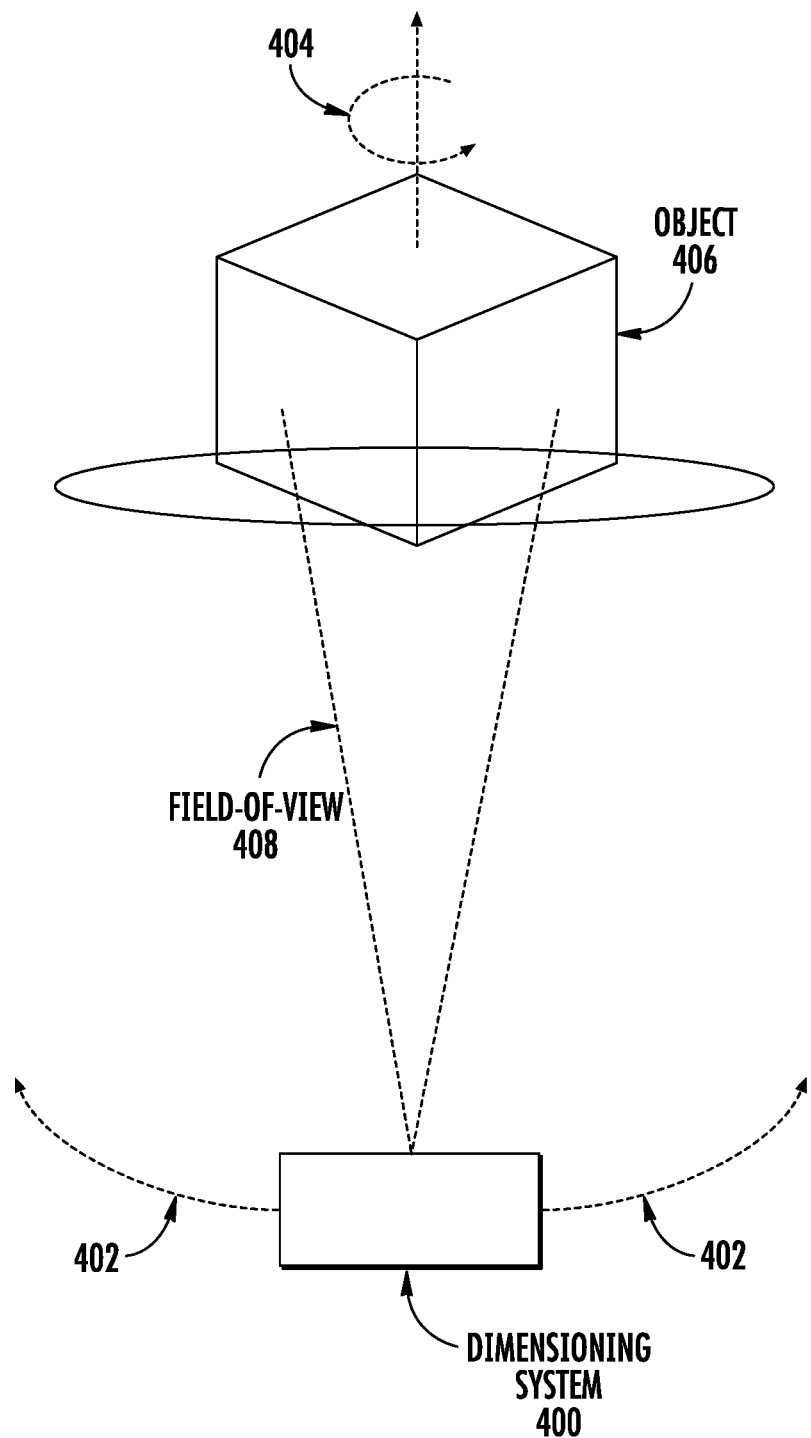
FIG. 4 graphically depicts the movement of the dimensioning system and/or the object in accordance with some example embodiments described herein.

FIG. 4 graphically depicts the movement of a dimensioning system 400 and/or the object 406, in accordance with some example embodiments described herein. In this aspect, FIG. 4 illustrates how movement 402 of the dimensioning system 400 and/or movement 404 of the object 406 may help capture (i.e., sense, sample, etc.) 3D data of the object 406. In this aspect, the movements 402 and/or 404 is performed for capturing multiple image frames of the object 406 from different locations, so that the movement allows for the capture of 3D data from more portions or views of the object 406 than could be obtained with a single view.

In one embodiment, the movement 402 and 404 of the dimensioning system 400 and/or the object 406 is automatic and does not require user participation. In this embodiment, the dimensioning system 400 may be coupled to movement devices (e.g., actuators, motors, etc.) that adjust the spatial relationship between the dimensioning system 400 and the object 406. In one example, the object 406 may be placed in a measurement area, and the dimensioning system 400 may be moved around the object 406 to collect range images from various perspectives or views as shown in FIG. 4. In another example, a fixed dimensioning system may collect range images as an object 406 is rotated (e.g., on a motorized turntable) as shown in FIG. 4. In these cases, upon movement 402, one or more movement parameters associated with movement of the dimensioning system 400 may be identified based on the image frames captured at different locations. In this aspect, according to various embodiments, the movement parameters may include, but not limited to, one or more of distances travelled by the dimensioning system 400 with respect to the object 406 for capturing the image frames. In some embodiments, the one or more movement parameters may also include angular orientation parameters which may be derived for each 3D point from a set of 3D points in the captured image frames. In this regard, the angular orientation parameters may include values of pitch, yaw, and/or roll experienced by the dimensioning system 400 for capturing the image frames from different locations. Thereafter, the identified one or more movement parameters are used for estimating a correspondence score for each 3D point in the captured image frame, which is further utilized for computing the dimensions of the object 406. Further details of the one or more movement parameters, and estimation of correspondence score are described hereinafter.

In another embodiment, the movement 402 and/or 404 of the dimensioning system 400 and/or the object 406 is performed by a user. In this regard, navigational commands (e.g., audio, visual, haptic feedback, etc.) may be generated by the processor of the dimensioning system 400 and conveyed to a user interface (e.g., screen, indicator lights, speaker, etc.), which may be associated with an electronic device used by the user. In this aspect, the user may follow the navigational commands to move the dimensioning system 400 and/or object 406. In accordance with various embodiments described herein, the instructions may include messages to help a user know (i) how far to move the dimensioning system 400 and/or the object 406, or (ii) how fast to move the dimensioning system 400 and/or the object 406, (iii) a particular location to move dimensioning system 400 and/or the object 406 to, and (iv) how long to continue moving dimensioning system 400 and/or the object 406 (e.g., when to stop moving). For example, the dimensioning system 400 may be a handheld device, and the user may move the dimensioning system 400 to change the field of view 408. In this case, the dimensioning system 400 may be configured to gather tracking information (e.g., sense its position and orientation within the environment) to perform processing on the range images captured by a range camera of the dimensioning system 400. Various aspects of installation environment of the dimensioning system is described in reference to FIGS. 9 and 10.

In some embodiments, the dimensioning system 400 may be moved in a variety of ways as the views and range images are captured. In some embodiments, the movements 402 and 404 may need to meet certain requirements to facilitate capturing of the range images at pre-defined or selected locations. For example, movements may be limited to movements having a constant range between the dimensioning system and the object, as changes in range can affect the image size of the light-pattern/object. In another example, the movement may be limited to a certain path or at pre-defined locations, which satisfy a pre-defined criterion for capturing the multiple range images of the object 406. In some examples, this path or the pre-defined condition may be determined using an expected object size/shape.

Figure 5:
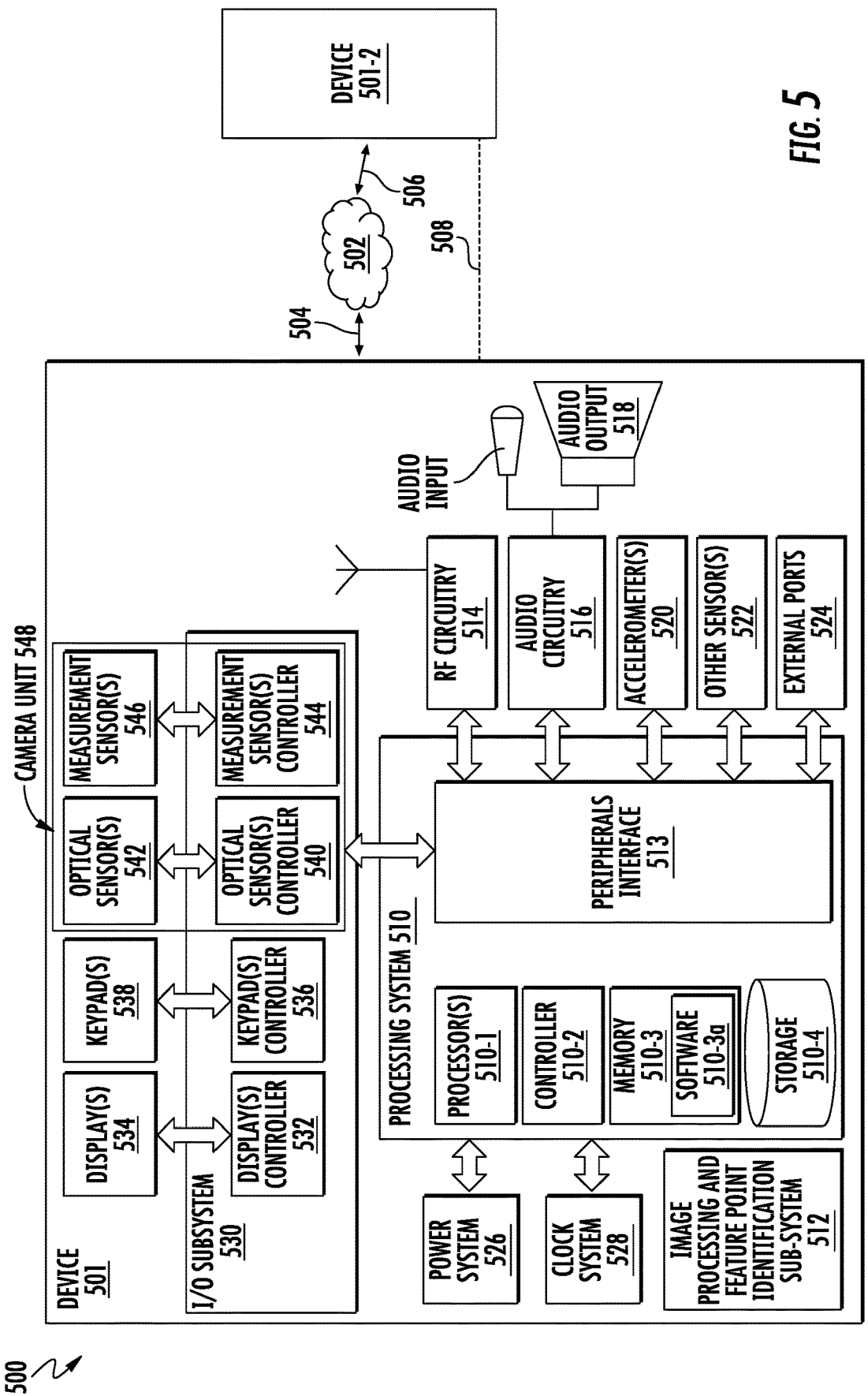
FIG. 5 is a block diagram illustrating various hardware elements of the dimensioning system in accordance with various example embodiments described herein.

FIG. 5 illustrates an exemplary dimensioning system 500 including a device 501, such as a mobile dimensioner device, in some embodiments of the present invention. The dimensioning system 500 may include other components not shown in FIG. 5, nor further discussed herein for the sake of brevity, such as additional hardware and software components. Illustratively, the device 501 may be configured to execute the operations described below in connection with FIGS. 6-10. In accordance with some example embodiments describe herein, the dimensioning system 500 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, netbooks, barcode scanners, radio frequency identification (RFID) readers, intelligent sensors, tracking devices, volume dimensioning devices, mobile dimensioners, and other similar computing devices.

In accordance with some embodiments described herein, the dimensioning system 500 of FIG. 5 can be connected to other devices, designated as "501-X." In one embodiment, the device 501 may be connected to another device 501-2 via a network 502, as illustrated. In this aspect, the network 502 may be any type of wide area network (WAN), such as the Internet, Local Area Network (LAN), or the like, or any combination thereof, and may include wired components, such as Ethernet, wireless components, such as LTE, Wi-Fi, Bluetooth, or near field communication (NFC), or both wired and wireless components, collectively represented by the data links 504 and 506. In other embodiments of the present invention, the device 501 may be connected to another device 501-2 via a wired communication channel 508. In this aspect, the wired communication channel 508 may be Universal Serial Bus (USB), Inter-Integrated Circuit (I2C), or other computer bus. In one embodiment, the device 501 is a mobile dimensioner device and the device 501-2 is a server than handles backend functions such as invoicing customers for packages being shipped in a material handling environment.

In accordance with various embodiments described herein, the device 501 of FIG. 5 may include a processing system 510 that may include one or more processors 510-1, such as Central Processing Units (CPUs), Application Specific Integrated Circuits (ASICs), and/or Field Programmable Gate Arrays (FPGAs), a memory controller 510-2, memory 510-3, which may include software 510-3a, and other components that are not shown for brevity, such as busses, etc. The processing system 510 may also include storage 510-4, such as a hard drive or solid state drive. In accordance with various example embodiments described herein, the device 501 may also include the image processing and feature point identification sub-system 512 (i.e. the image processing and feature point identification sub-system 112 as described in FIG. 1) that may be adapted to identify 3D points from the images captured by a camera unit 548 of the device 501. The identified 3D points correspond to a geometric feature of the object for computing dimensions of the object. In this regard, the camera unit 548 of the device 501 may be communicatively coupled to the processing system 510 and may include optical sensors, such as the optical sensors 542.

As illustrated, the processing system 510 may also include a peripherals interface 513 for communicating with other components of the device 501, including but not limited to, a radio frequency (RF) circuitry 514 (e.g. Wi-Fi and/or cellular communications circuitry such as for wireless Ethernet, Bluetooth, and near field communication (NFC)), an audio circuitry 516 with the audio input component (such as a microphone) and audio output component 518 (such as a speaker), one or more accelerometers 520, one or more other sensors 522 (such as a location determination component such as a Global Positioning System (GPS) chip), and one or more external ports 524 (which may be used for smart card readers or for wired connections such as wired Ethernet, USB, serial or I2C ports). In this aspect, the RF circuitry 514 and external ports 524 may individually and collectively make up the communication interfaces for the device 501. In an aspect, the processing system 510 may also be connected to a power system component 526 that may be used to power the device 501, such as a battery or a power supply unit. In an aspect, the processing system 510 may also be connected to a clock system component 528 that controls a timer for use by the disclosed embodiments.

Illustratively in accordance with various example embodiments described herein, the peripherals interface 513 may also communicate with an input/output (I/O) sub-system 530, which includes a display(s) controller 532 operative to control display(s) 534. In some embodiments, the display(s) 534 is a touch sensitive display system, and the display(s) controller 532 is further operative to process touch inputs on the touch sensitive display 534. The I/O sub-system 530 may also include a keypad(s) controller 536 operative to control keypad(s) 538 on the device 501. The I/O sub-system 530 may also include an optical sensor(s) controller 540 operative to control one or more optical sensor(s) 542. The optical sensor(s) 542 may include, but is not limited to, a barcode sensor, a camera, and an image sensor. The I/O sub-system 530 also includes a measurement sensor(s) controller 544 operative to control one or more measurement sensor(s) 546. The measurement sensor(s) may include, but is not limited to, a point-cloud projection sensor, a structured light sensor, a stereoscopic camera, and an n-scopic camera. In accordance with some embodiments, the optical sensors 542 may correspond to the range cameras 106 and 212 as described in reference to FIGS. 1 and 2 respectively. Accordingly, the measurement sensors 544 may correspond to the pattern projector 102 and 210 as described in reference to FIGS. 1 and 2 respectively. Illustratively, in an embodiment, at least one of the optical sensor controller 540, the optical sensors 542, the measurement sensor controller 544, the measurement sensors 546, and/or the image processing and feature point identification sub-system 512 may correspond to a camera unit 548 of the device 501. In accordance with various embodiments of present subject matter, the components of device 501 may be interconnected using one or more buses, represented generically by the arrows of FIG. 5, and may be mounted on a motherboard (not shown) or some other appropriate configuration.

Figure 6:
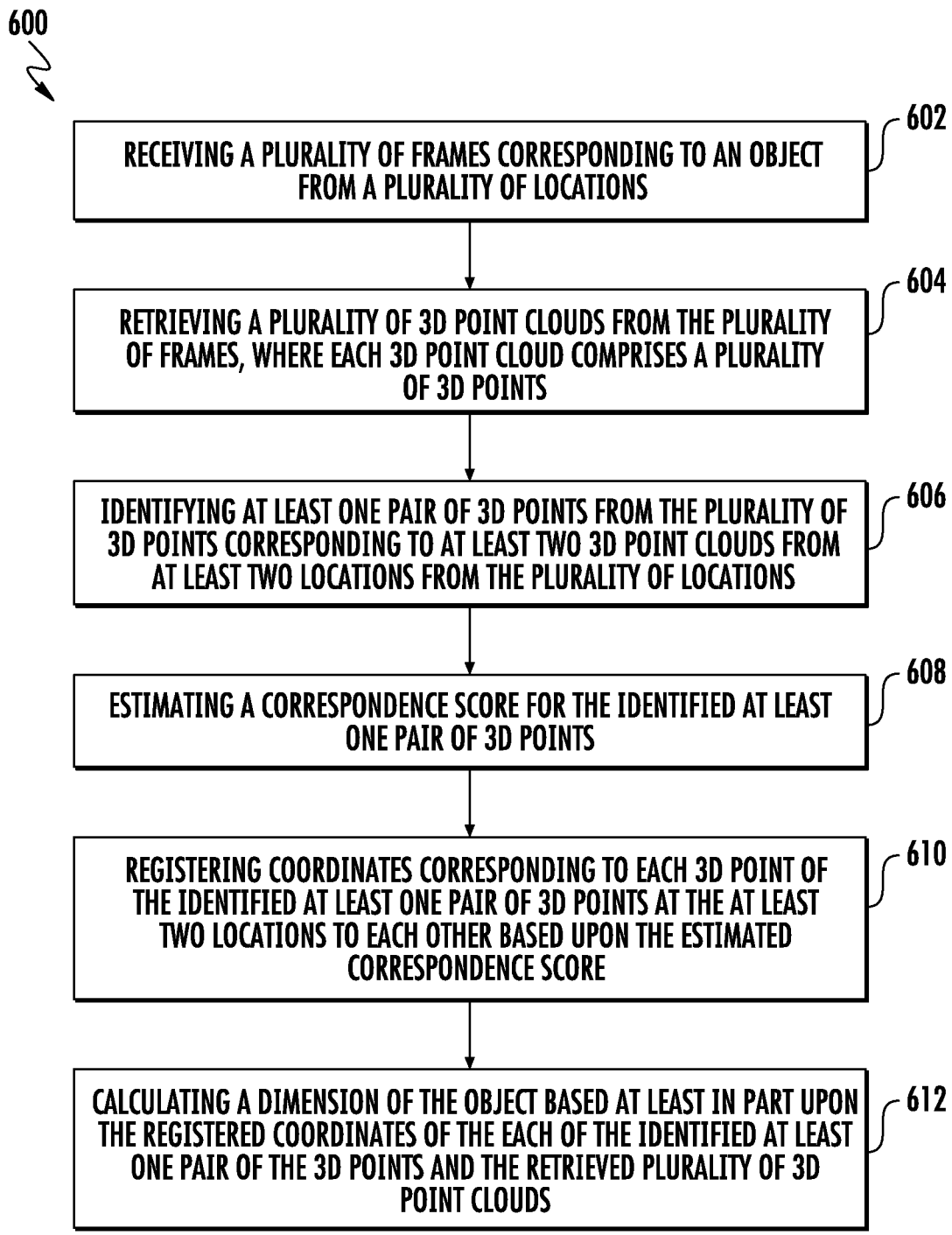
FIG. 6 illustrates a flowchart describing a method of computing dimensions of an object using range images, in accordance with some example embodiments described herein.

FIG. 6 illustrates an example flowchart of operations performed by a dimensioning system (such as dimensioning systems 100, 200, 300, 400, and 500 of FIGS. 1-5) in accordance with example embodiments of the present invention. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 6, when executed, convert a computer or processing circuitry into a particular machine configured to perform an example embodiment of the present invention. Accordingly, the operation of FIG. 6 defines an algorithm for configuring a computer or processor, to perform an example embodiment. In some cases, a general-purpose computer may be provided with an instance of the processor which performs the algorithm of FIG. 6 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 6 illustrates a flowchart describing a method 600 of computing dimensions of an object by a dimensioning system using range images in accordance with various example embodiments described herein. The dimensioning system may be, for example, the dimensioning system 100, 200, 300, 400, 500, as illustrated in FIGS. 1-5 respectively (hereinafter referred throughout the description as the dimensioning system 500 for purpose of clarity and understanding).

At step 602, the device 501 of the dimensioning system 500 includes means, such as the camera unit 548, to capture and/or receive a plurality of image frames of an object from a plurality of locations. In this aspect, two or more image frames of the multiple image frames are associated with at least two locations of the multiple locations and satisfy a predefined criterion associated with a geometric feature on a surface of the object. In accordance with various embodiments described herein, these image frames satisfy the pre-defined criterion if at least a pair of 3D points of these image frames corresponding to an edge on the object where at least two planar surfaces of the object are mutually orthogonal. Illustratively, in one embodiment, the device 501 is a mobile dimensioner, such as a handheld device, which may be adapted to be moved to different locations by a user in order to capture multiple image frames from different locations (thereby capturing different viewpoints of the object). Illustratively, the camera unit 548 of the dimensioning system 500 may be used to capture multiple image frames of the object, and may be moved in a manner similar to the movement 402 and/or 404 of the dimensioning system 400 as described in reference to FIG. 4.

In an embodiment, the camera unit 548 of the device 501 may capture a video feed of the object as the camera unit 548 is being moved around the object and stopped at different locations for capturing the image frames. Accordingly, in this aspect, the device 501 of the dimensioning system 500 may identify image frames that satisfy the pre-defined criterion from the video feed.

At step 604, the device 501 of the dimensioning system 500 includes means, such as the image processing and feature point identification sub-system 512 coupled to the processing system 510, to retrieve a plurality of 3D point clouds from the plurality of captured image frames. In this regard, each 3D point cloud retrieved from the captured image frames may include a plurality of 3D points. According to some example embodiments, the retrieving of multiple 3D point clouds from the captured image frames may be performed in a manner as described in reference to FIG. 2, (i.e. based on sensing by the camera unit 548, illustratively, by the optical sensors 542 and/or the measurement sensors 546, (i) a reflection of a structured light pattern projected on the object by the pattern projector 102 along with the image frames with projected light pattern captured by the camera unit 548 and (ii) identifying image offsets in the point-cloud pattern detected by the camera unit 548, such as the range camera 106 of the dimensioning system 500). Illustratively, in accordance with some embodiments, various other techniques based on such as, but not limited to time of flight estimation, triangulation or phase shift estimation, etc. may be used by the image processing and feature point identification sub-system 512 of the device 501 for retrieving the plurality of 3D point clouds from the captured image frames.

At step 606, the device 501 of the dimensioning system 500 includes means, such as the image processing and feature point identification sub-system 512, to identify at least one pair of 3D points from the plurality of 3D points. The plurality of 3D points, in this case, correspond to at least two 3D point clouds which are retrieved from the image frames that are captured at at-least two locations from the multiple locations, as described at step 602. Further, in this aspect, the image processing and feature point identification sub-system 512 identifies the at least one pair of 3D points which corresponds to a geometric feature of the object, such as, but not limited to, corners, interest points, blobs or regions of interest point, edges, or ridges, from the captured image frames. Illustratively, in some embodiments, the geometric feature may be a distinguishing feature on the object, such as, but not limited to, a corner of a cuboid/box shape object, or a unique protrusion on a surface of the object etc. In this aspect, the identification of the at least one pair of 3D points may involve using various interest point detection techniques, such as but not limited to, corner detection, edge detection, feature detection etc. In this aspect, in some example implementations, the edge detection techniques may be used for identifying each 3D point from at least one pair of 3D points that passes through an edge. For example, the image processing and feature point identification sub-system 512 may identify at least a pair of 3D points that corresponds to an edge on the object where at least two planar surfaces of the object are mutually orthogonal in image frames from the video feed. In an example embodiment, the at least one pair of 3D points corresponds to two corners of the object and connects these two corners to form an edge of the object, through which two planar surfaces (e.g. two lateral surfaces of the object) are mutually orthogonal to each other. In some embodiments, the feature point identification may include identifying regions in the captured image frames, i.e. sets of pixels from the captured image which provides distinct characteristics. For instance, in some cases, 3D points in a captured image frame which represents a region that is locally distinctive within all pixels of the captured frame may be identified. In this aspect, such 3D points correspond to set of pixels within the captured image frame that represents either blobs of edge pixels and/or any distinctive feature of the object. In one example, such set of pixels usually provides a reasonable edge strength in two directions within a portion of the set of pixels that may be used for feature point identification. Accordingly, the 3D points representing such set of pixels, may be identified as a feature point in the captured image frames. In alternative embodiments, feature point identification may be based on template matching, where a pre-defined template image may be matched with regions of a full image frame captured by the device 501. In this aspect, 3D points or set of pixels in one region of the image frame (which matches with the pre-defined template within full image frame captured by the device 501) may be identified as feature points.

In accordance with various embodiments described herein, the image processing and feature point identification sub-system 512 may use the captured image frames to determine if at least two planar surfaces of the object 406 are mutually orthogonal, i.e. the at least two planar surfaces meet at a right angle in the captured image frames. In some cases, if more than two image frames are captured, then the at least two surfaces of the object in the captured image frames may be orthogonal if a ring enclosing the multiple image frames may be formed, such that the at least two surfaces of the object from the multiple image frames meet at right angles. Alternatively, in other example implementations of said embodiment, the image processing and feature point identification sub-system 512 may use other techniques for determining if the two planar surfaces are mutually orthogonal in the captured image frames. Also, in some cases, multiple image frames are captured from two different viewpoints such that the two viewpoints are 90 degrees apart when identified from an aspect graph. For instance, a ring centered on the object and enclosing the multiple image frames of the object may be created by the feature point identification sub-system 512 to identify feature points. In such cases, one image frame may show a length of the object 406 and the other image frame may show a width of the object 406, which may be used for shape estimation of the object. Further details related to the pre-defined criterion and selection of image frames and their associated locations are described in reference to FIG. 7. In some embodiments, the edge detection techniques may include using search based edge detection techniques or zero crossing based edge detection techniques. Also, in this respect, the geometric feature to which the at least one pair of identified 3D points corresponds to is detectable from the at least two locations in the image frames captured at the at least two locations.

At step 608, the device 501 of the dimensioning system 500 includes means, such as the image processing and feature point identification sub-system 512, to estimate a correspondence score for the identified at least one pair of 3D points based upon one or more movement parameters associated with movement of the device 501. In this regard, the correspondence score may be estimated using various techniques. For instance, in one embodiment, for each identified 3D point, from amongst the at least one pair of 3D points, gradient values may be computed. A 2D matrix representing gradient values of the 3D points may be used to further compute eigenvectors representing dominant orientations or set of pixels in the captured image frames with distinctive features, such as edges, blobs etc. In some implementations, the eigenvectors may be computed based on one or more movement parameters associated with the movement of the device 501. In this aspect, the computed eigen values may be compared with a pre-defined threshold value that affirms to the image processing and feature-point identification subsystem 112, where the identified feature corresponds to a feature point in the captured image frame. Accordingly, the eigen values which satisfy the pre-defined threshold may be used to estimate correspondence between two feature points in different image frames captured by the device 501.

In another embodiment, aspect graphs representing "aspects" or "features" in the captured multiple frames of images may be constructed for estimating the correspondence score. In this regard, the aspect graphs may be constructed using the multiple image frames of the object captured from selective viewpoints. Further, from the 3D points in the aspect graph, "side elevations," which corresponds to set of 3D points where a transformation of a view point for viewing the object occurs in the aspect graph, may be identified. Accordingly, a "transfer relation" between the feature points (i.e. 3D points representing side elevations) from different image frames captured at the selective viewpoints may be obtained based on the one or more movement parameters to build an object model database. The object model database may be further used for matching an input image (for example, a captured image frame with stored object models) in the object model database to identify correspondence score (for instance, an Euclidean distance) between a feature point from a first image frame to the feature point in the second image frame from amongst the captured image frames.

Illustratively, in an embodiment, the one or more movement parameters includes displacement values (for instance, values in x, y, and z coordinate planes), where the displacement values are indicative of displacement of at least one of the device 501 and/or an object with respect to each other, caused by the movement of the device 501 and/or the object for capturing the plurality of images. In this aspect, in an embodiment, the displacement values are derived based on a distance travelled by the device 501 to capture the plurality of images. In accordance with said embodiment, the one or more movement parameters may also include angular orientation parameters including values corresponding to rotation angles, (i.e. a pitch, a yaw, and a roll) experienced by the device 501, upon movement of the device 501 including the camera unit 548 to the plurality of locations for capturing the plurality of images. In this regard, the movement parameters are determined with respect to each of the 3D point from amongst the identified at least one pair of the 3D points. In accordance with various example embodiments, the movement parameters, including, but not limited to, displacement values (x, y, and z) and the rotation angles, which may be determined by the processing system 510 via at least one of the optical sensors 542, the measurement sensors 546, the one or more accelerometers 520, and/or the other sensors 522 illustrated in FIG. 5. In this regard, in an example implementation of said embodiments, a correspondence score between a feature point represented as fn (x, y, ti) in a first captured image frame at an ith time interval and a feature point represented as fn (x, y, ti+1) in the next captured image frame at a next time interval i+1 may be estimated for all feature points identified at step 606.

At step 610, the device 501 of the dimensioning system 500 includes means, such as the image processing and feature point identification sub-system 512, to register coordinates corresponding to each 3D point of the identified at least one pair of 3D points. In this regard, the registration of coordinates corresponding to each 3D point of the identified at least one pair of 3D points is based on the estimated correspondence score. In an aspect, the registration of the at least one pair of 3D points may involve deriving a transformation function. The transformation function, in this regard, may be used on each 3D point in respective sets of 3D points (i.e. sets of 3D points corresponding to the 3D point clouds which are retrieved from the image frames that are captured at selective locations, i.e. the locations where the image frames satisfying the pre-determined criterion).

In accordance with an embodiment, the registration of the at-least one pair of identified 3D points may involve computing geometrical similarity for each 3D point from amongst the identified at least one pair of 3D points. The geometric similarity in this aspect may be computed for determining how similar two 3D points are to each other in two different image frames. In an embodiment, the registration of the at-least one pair of identified 3D points may be based on using standard image registration techniques, for example, but not limited to, 'scale shift invariant transformation', 'Hough transform', or any other image registration techniques. In some cases, the captured image frames correspond to 2D color image frames captured via a camera unit (for instance, the camera unit 548) may be used along with 3D point clouds to perform registration of the at least one pair of identified 3D points. In another embodiment, the image processing and feature point identification sub-system 512 may estimate length, width, and height multiple times, e.g. each time based on one of the captured image frames from each of the viewpoints. Thereafter, the transformation function may be used to determine how the lengths and widths relate between the different views and further, based on averaging the estimations, actual length, width, and height of the object may be computed.

At step 612, the device 501 of the dimensioning system 500 includes means, such as the image processing and feature point identification sub-system 512, to compute dimensions of the object based at least in part upon (a) the registered coordinates of the each of the identified at least one pair of the 3D points and (b) the retrieved plurality of 3D point clouds. In this regard, the transformation function (based on the registering of the coordinates, as described at step 610) provides a mapping of 3D points identified from one image captured at a first location to respective 3D points identified in other image frame captured at a second location. For example, if two image frames (i.e. a first image frame and a second image frame including a corner of an object) are captured by a dimensioner, such as the device 501, from two different view-points (i.e. two different locations based on moving the device 501 from a first location to another location), the transformation function provides a transformational relationship between coordinate values of the point representing the corner of the object in the first image frame compared to coordinate values of the point representing the corner of the object in the second image frame. Accordingly, the transformation function is used to map each set of 3D points (corresponding to all the 3D point clouds) captured from all viewpoints into a single reference frame representative of a complete 3D scan of the object. This single reference frame corresponds to a combined point cloud, which may be used to estimate a minimum bounding box, which may fit around the object, and may be used for computing the dimensions of the object. In this aspect, for computing the dimensions of the object, a reference frame, such as a ground plane with respect to the object in a field of view of the device 501, may be identified by the image processing and feature-point identification subsystem 112 to compute a Euclidean distance between the reference frame, i.e. the ground plane, and one or more 3D points in the combined point cloud of the object. In this regard, in some cases, a maximum of the computed Euclidean distances may represent an estimation of a height of the object. Further, in accordance with various embodiments described herein, the transformation function and the computed height of the object is utilized by the image processing and feature point identification sub-system 112 to identify co-relation between length and width of the object. In this regard, in one embodiment, various object points of the object are projected on the reference plane and a minimum bounding box is estimated, which may enclose the projection of the object points on the reference plane. The dimensions of the minimum bounding box in such cases represents the dimensions, including a length and width of the object. In other exemplary embodiments, various other algorithms for estimating dimensions of the object using the combined point cloud may be utilized for computing the dimensions of the object.

Figure 7:
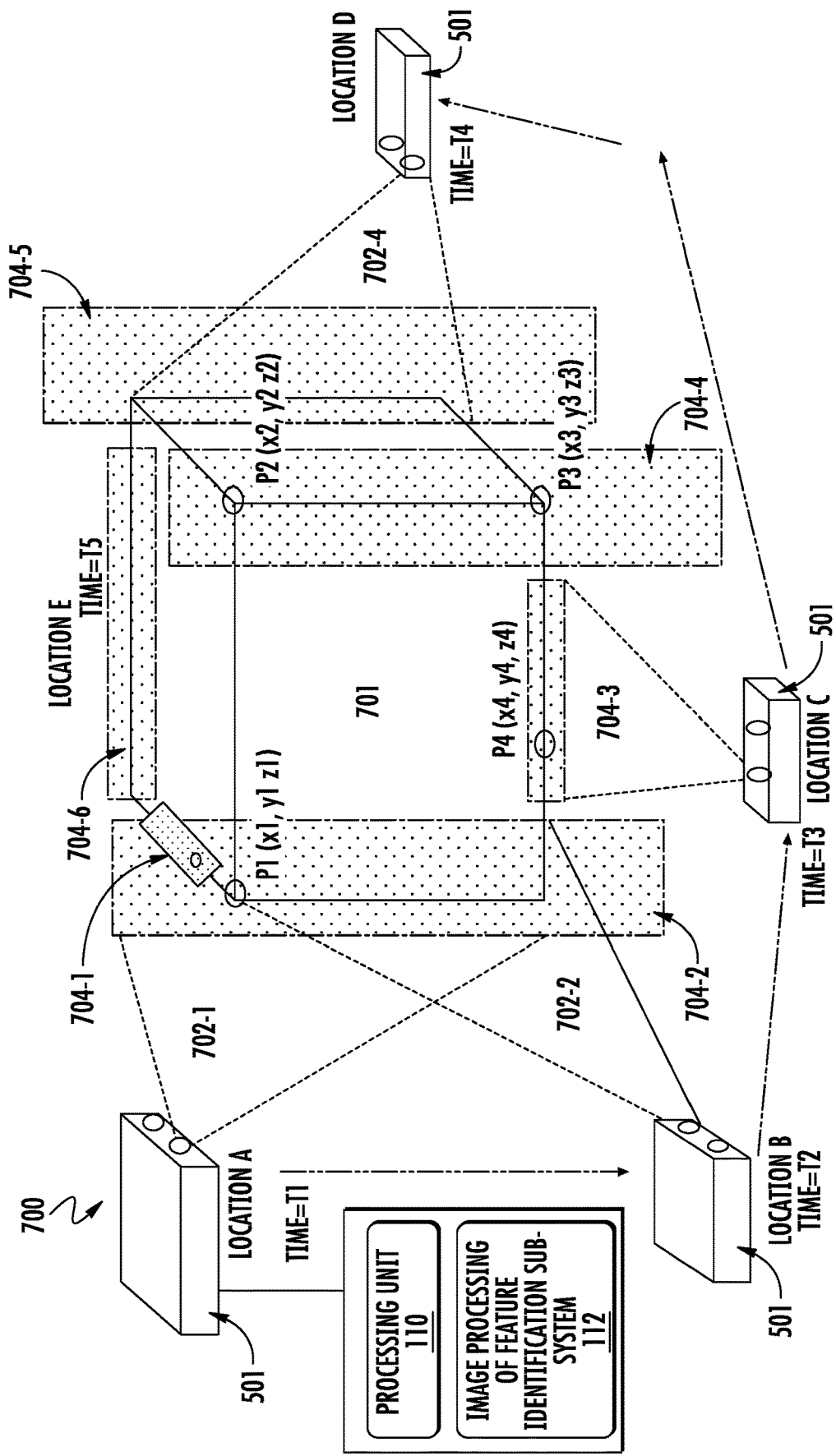
FIG. 7 illustrates an exemplary scenario of a system for computing dimensions of an object by using range images captured at selective locations in accordance with some example embodiments described herein.

FIG. 7 illustrates an exemplary scenario of a system 700 for computing dimensions of an object by using range images captured at selective locations in accordance with some example embodiments described herein. In this aspect, the example scenario of the system 700 as illustrated in FIG. 7 is representative of the steps 602-612 of FIG. 6 performed by the device 501 for computing dimensions of an object. As illustrated, a dimensioner, such as the device 501, may be moved to different locations illustrated as, locations A-E, for capturing image frames of the object from different viewpoints 702-1, 702-2, 702-3, 702-4, and so on. In various embodiments of the present invention, computing dimensions of the object does not require continuously capturing a large number of image frames of the object. Rather, in accordance with various embodiments described herein, the device 501 may capture a few of image frames of the object 701, such as lateral faces of the object. For example, the device 501 is moved to selective locations, such as the locations A-E, as shown in FIG. 7. In this aspect, at the selective locations, the device 501 in its field of view may capture the image frames for regions 704-1, 704-2, 704-3, 704-4 . . . 704-n of the object 701. The regions 704-1 . . . 704-n may cover 3D points on the object which provides a distinguishing feature on the object, for instance, as illustrated, the regions 704-1, 704-2 . . . 704-n covers 3D points like, P0 (x0, y0, z0), P1 (x1, y1, z1), P2 (x2, y2, z2), P3 (x3, y3, z3), etc., which are representatives of corner points or points on edges of the object. In accordance with various example embodiments described herein, the locations A-E represent such locations where the corresponding image frames satisfy the pre-defined criterion, as described at step 602 in reference to FIG. 6 (i.e. the image frames captured by the device 501 at these locations have at least a pair of 3D points corresponding to an edge on the object where at least two planar surfaces of the object are mutually orthogonal). Accordingly, in accordance with various example embodiments described herein, the points P0, P1, P2, P3, etc. correspond to the identified at least one pair of 3D points, which correspond to the geometric feature on the object, as described at step 606 in reference to FIG. 6.

In accordance with the illustrated embodiment, the device 501 may be moved around the object to capture image frames of the object at different intervals of time T1, T2, T3, T3', T4, and so on. In this aspect, the device 501 may either be moved manually (for instance, by a worker in a material handling environment who may be handling dimensioning of multiple items on a conveyor belt), or in an automated machine driven fashion, such as by means of actuators or control motors which drive movement of the device 501. In this aspect, according to some example embodiments, the processing system 510 of the device 501, via means of the display controller 532, may provide various navigational commands on the display 534 to direct a user to the plurality of locations, such locations A-E for capturing the image frames having one or more 3D points, such as points P1-P4. At each of the locations A-E, the points P1-P4 represent points of an edge on the object at which at least two surfaces of the object are mutually orthogonal in the captured image frame.

In some embodiments, the camera unit 548 of the device 501 may continuously capture a video feed while the camera moves at different locations around the object. Based on processing of an initial set of the image frames from the video feed, the device 501 may identify selective image frames from the initial set of image frames, and process the selective image frames to determine at least one location where the device 501 needs to be for further capturing of the image frames. In this aspect, the device 501 may provide navigational commands to the worker for moving the device 501 to the at least one determined location to take images frames, and image frames at these locations satisfy the pre-determined criterion as described in accordance with various embodiments herein. In accordance with some embodiments, the navigational commands may be provided subsequent to determining the at least one location and prior to retrieving the plurality of 3D point clouds. Illustratively, the navigational commands may include text messages or commands such as, for example, "move clockwise to the next corner of the object" or visual commands where a preview image of an object (such as a pallet) may be displayed on the display 534 and a pointer indicating "where to go" may be overlaid on the object in the displayed preview. Alternatively, in some embodiments, voice directed instructions may be provided by the processing system 510 via the audio circuitry 516 and the audio output component 518 of the device 501, and may further include haptic feedback, such as vibrating the device 501 and/or providing voice directed instructions.

Figure 8:
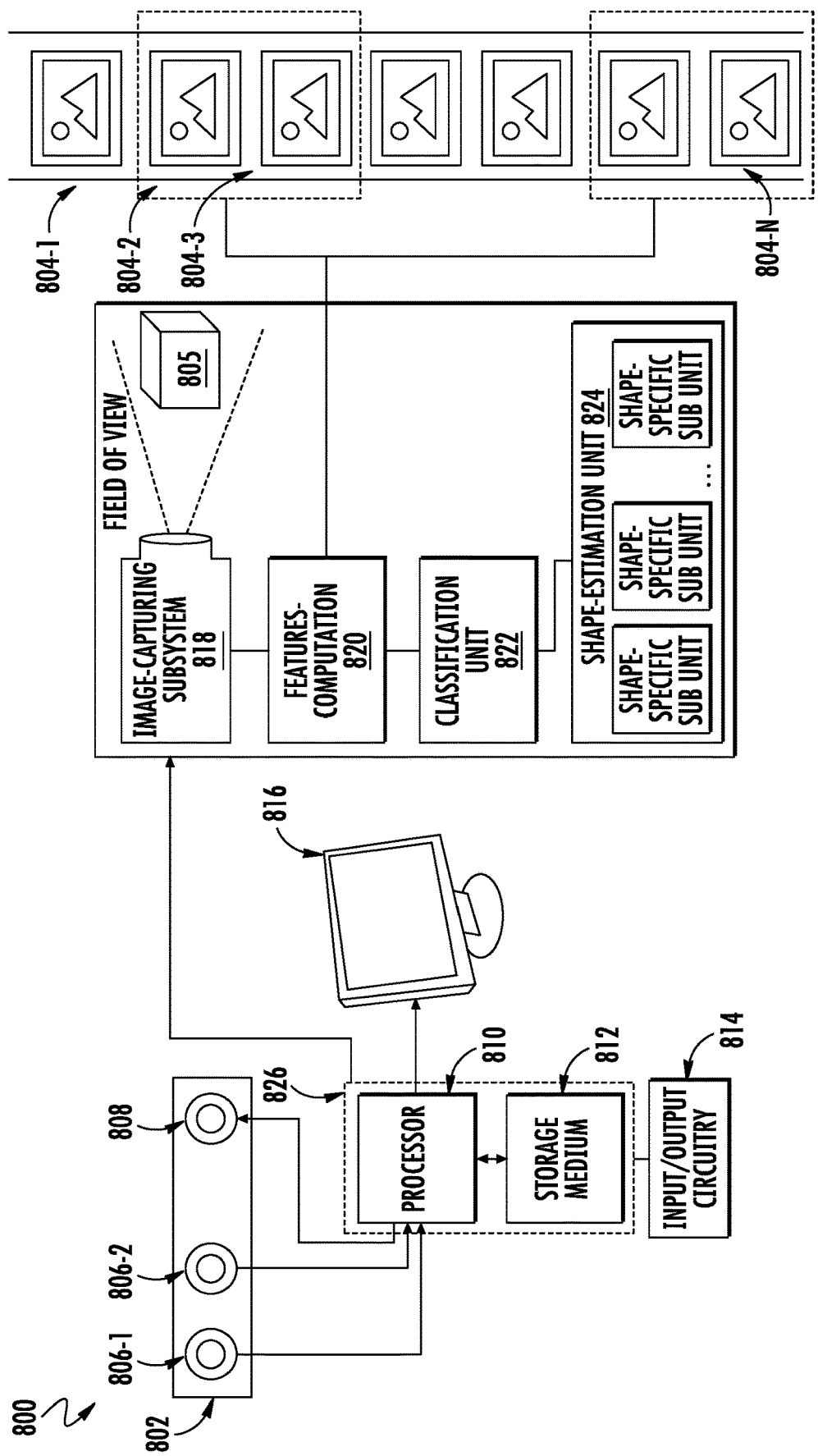
FIG. 8 illustrates an exemplary scenario of a system for computing dimensions of an object by identifying a set of image frames from amongst multiple image frames captured in a video feed, in accordance with various embodiments described herein.

FIG. 8 illustrates an exemplary scenario of a dimensioning system 800 for computing dimensions of an object by identifying a set of image frames from amongst multiple image frames captured in a video, in accordance with various embodiments described herein. As illustrated, the dimensioning system 800 includes a dimensioner 802 adapted to capture a video feed including multiple image frames 804-1, 804-2, . . . 804-N of an object 805 that is to be dimensioned. In accordance with various embodiments described herein, the dimensioner 802 may correspond to the device 501, as described in reference to FIG. 5. Illustratively, one or more components 806-1, 802-2, and 808 of the dimensioner 802 may be communicatively coupled to a processor 810. In this aspect, the processor 810 may be further communicatively coupled to a storage medium 812, an input/output circuitry 814, and a display unit 816. The processor 806 may perform various operations related to executing set of instructions, to the dimensioner 802 to: (i) capture multiple image frames and (ii) process the image frames captured by the dimensioner 802 via one or more of an image capturing sub-system 818, a feature computation unit 820, a classification unit 822, and a shape estimating sub-system 824 including one or more shape specific estimation sub-units.

In some embodiments, components 810-826 may belong to the dimensioner 802 itself, where both imaging and computing dimensions of the object is performed based on operations performed locally by various components 810-826 of the dimensioner 802. Alternatively, in some embodiments, the components 810-826 may belong to a remote computing device, such as, computing device 826, which may communicate with the dimensioner 802 via the communication network (such as the network 502 as described in reference to FIG. 5) to perform various operations for imaging and computing dimensions of the object. In this regard, the range imaging unit 806-1 of the dimensioner 802 may sense a reflected light pattern of the pattern projected by the pattern projecting unit 808 along with capturing 2D images of the object, and transmit captured data to the remote computing system 826 where all operations including, but not limited to, the processing of the images may be performed for computing the dimensions of the object.

According to one embodiment, the dimensioner 802 includes a camera unit, which includes the range camera 806-1 for imaging a light pattern projected on an object by the pattern projecting unit 808 and the RGB camera 806-2 for capturing a video feed including sequence of the image frames 804-1, 804-2, . . . , 804-N. In this aspect, the camera unit 806-1 may also be adapted to capture the range image, based on various operations described in reference to FIG. 2 such as, by means of the range camera 806-1, the pattern projecting unit 808, and the image capturing sub-system 818. In this aspect, the feature computation unit 820 may assess various feature points on a surface of the object from the captured images, typically referred as "object information." In accordance with some example embodiments described herein, the image capturing sub-system 818 and the feature computation unit 820 may correspond to the image processing and feature point identification sub-system 112 as described in reference to FIG. 1. The feature computation unit 820 may analyze a curvature c and angular orientation 0 for each feature point in a point cloud representing the surface of the object 805 in the preview of each image frame with respect to a reference plane in a field of view of the dimensioner 802. Further, in accordance with some embodiments, each of the multiple image frames 804-1, 804-2, 804-3 . . . 804-N may be temporarily stored in the storage medium 812, and may be retrieved via the processor 810 for identifying one or more image frames. For example, image frames 804-2 and 804-3 may be retrieved as they include at least one pair of 3D feature points on the object. In this regard, each of the at least one pair of 3D feature points from the identified image frames 804-2 and 804-3 corresponds to a geometric feature of the object. In this aspect, the geometric feature of the object may be any distinguishing feature on surface of the object, including, but not limited to, a corner, interest points, blobs or regions of interest point, edges, or ridges, etc. identified in a preview of the captured image frames 804-1, 804-2, 804-3, . . . , 804-N. For example, in some embodiments, the image processing and feature point identification sub-system 112 may identify at least a pair of 3D points that corresponds to an edge on the object where at least two planar surfaces of the object are mutually orthogonal in image frames from the video feed. In an example embodiment, the at least one pair of 3D points corresponds to two corners of the object, and connecting these two corners forms an edge of the object and through which two planar surfaces (e.g. two lateral surfaces of the object) are mutually orthogonal to each other. In this regard, the identification of at least a pair of 3D points may be performed based on using similar techniques as described at step 606 in reference to FIG. 6.

In accordance with various embodiments described herein, the identified image frames 804-2 and 804-3 from the multiple image frames captured in the video feed corresponds to those image frames which are captured from at least two locations and satisfy a pre-defined criterion. It may be noted that the at least two locations are amongst multiple locations where the dimensioner 802 may be moved for capturing the video. In accordance with said embodiment, the image frames 804-2 and 804-3 satisfy the pre-defined criterion where at least one edge of the object is present on which at least two surfaces of the object are mutually orthogonal. For example, the image frame may include a corner of a cuboid shape object where 3 edges (extending in x, y, and z coordinate planes) meets and where at least two lateral surfaces of the object are mutually orthogonal. In accordance with various embodiments described herein, the processor 810, via the feature computation unit 820 takes various parameters into consideration for: (i) identifying the at least one pair of 3D points and (ii) determining at least two locations from where the image frames are captured (which includes the at least one pair of identified 3D points). For instance, in one example implementation, the feature computation unit 820 may determine similarities and dissimilarities in characteristics of features of various 3D points identified from 3D point clouds retrieved from the captured image frames (i.e. changes observed in a 3D point as previewed in a first image such as the image frame 804-1 and when moving to a preview of same 3D point in next image, such as the image frame 804-2). Also, in another example implementation, the feature computation unit 820 may compute a correspondence score for each of the 3D point from amongst the identified pair, for instance, based on operations as described at step 608 in reference to FIG. 6, to identify the at least two locations.

Accordingly, based on the identification of (i) the image frames having at least one pair of 3D points which correspond to a geometric feature on the object and (ii) the at least one location from where the identified image frames are captured, the processor 810 via the input/output circuitry 814 provides navigational commands to a worker for capturing more images at identified at least one location. In this aspect, in one embodiment, the navigational commands may be provided on the display unit 816 and/or an audio output unit such as a speaker or a headset which may be in communication with the processor 810. In accordance with various embodiments described herein, based on the navigational commands, selective image frames of the object are captured at the identified locations by the workers. In this aspect, as the worker moves to such viewpoints (including, but not limited to the identified at least two locations) for capturing the image frames based on directions provided in form of navigational commands, instead of continuously capturing, storing, and processing a high number image frames, the dimensioner 802 selectively captures the image frames at these viewpoints. These selectively captured image frames have a high count of such pairs of 3D feature points in preview of the captured image frames, which corresponds to one or more geometric feature on the object, such as corners, edges, etc. These identified pairs of 3D feature points are then utilized by the processor 806 for computing dimensions of the object based on performing operations such as ones as described at steps 608-612 in reference to FIG. 6. In this way, by capturing a relatively lesser number of image frames (e.g. two to four rang images), an overall time required for computing dimensions of the object is significantly reduced compared to conventional dimensioning systems.

Figure 9:
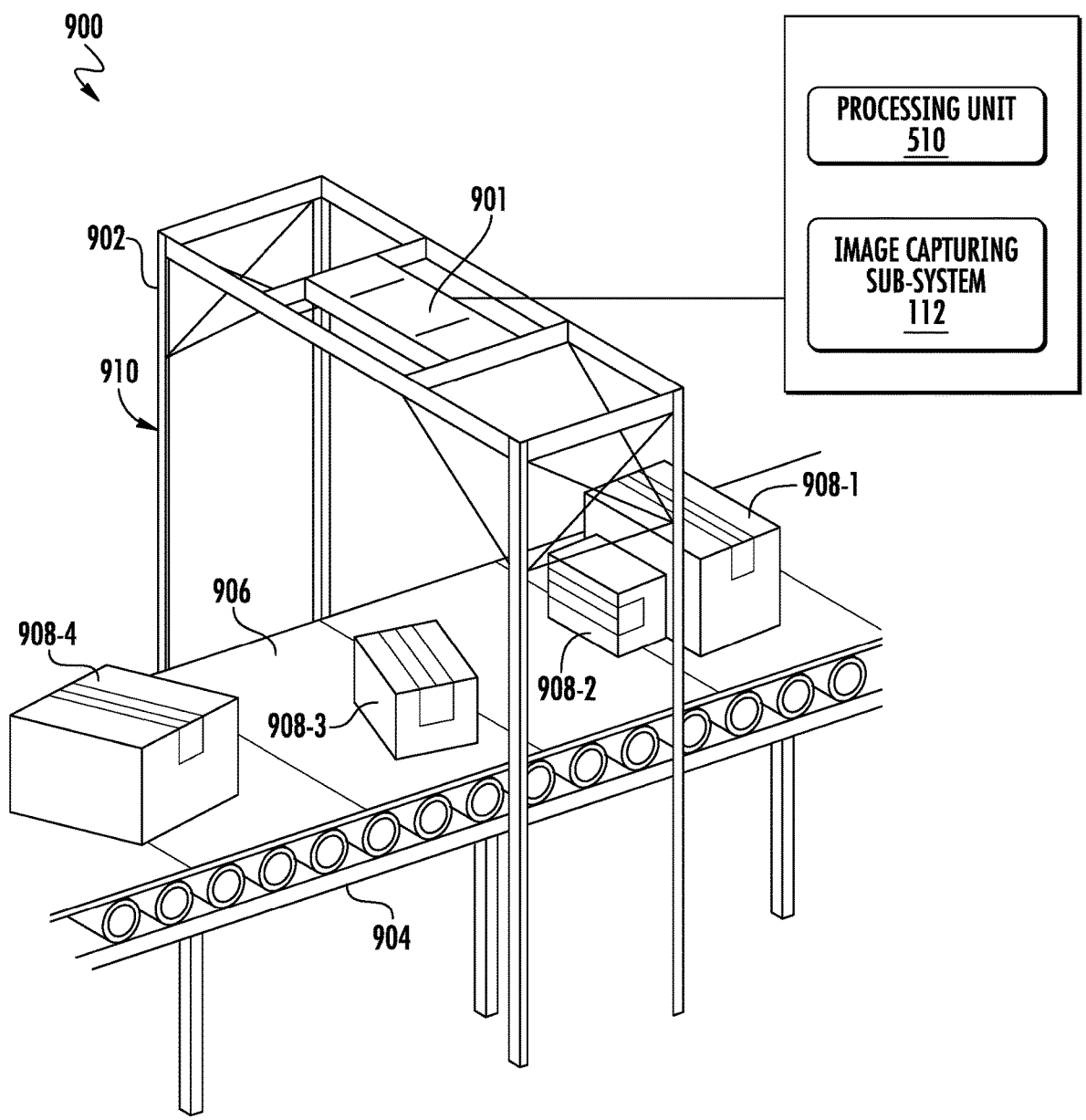
FIG. 9 illustrates an example environment where the dimensioning system may be installed for computing the dimensions of various objects, in accordance with some example embodiments described herein.

FIG. 9 illustrates an example environment 900 where a dimensioner device 901 (such as the device 501 of FIG. 5) may be installed for computing the dimensions of various objects, in accordance with some example embodiments described herein. As illustrated, a dimensioning station 902 is positioned at a fixed location along a conveyor system 904 in a material handling environment, such as, but not limited to, a warehouse, an inventory, or a shipping center. In some embodiments, the conveyor system 904 may contain a conveyor belt 906, which provides not only a level surface on which the objects can travel, but also an optical reference background for the dimensioner device 901. As illustrated, in such material handling environment, objects 908-1, 908-2, 908-3, 908-4 are conveyed along the conveyor system 904 for various operations such as shipping, inventory storage or transport. Illustratively, the dimensioning station 902 further includes a support structure 910 that supports the dimensioner device 901, which is positioned above a section of the conveyor system 904. The support structure 910 and the dimensioner device 901 can be installed as shown or in any number of suitable configurations.

In this aspect, the dimensioner device 901 includes imaging and sensing components (such as components 802-824 as described in reference to FIG. 8) for capturing images of the objects 908-1, 908-2, and so on as these objects pass below the dimensioner device 901 on the conveyor belt 906. In an embodiment, the dimensioner device 901 includes an image processing and feature point identification sub-system for computing the dimensions of the objects 908-1, 908-2, 908-3 and so on, based on performing the operations described at steps 602-612 of the method 600 in reference to FIG. 6. In some embodiments, the dimensioner device 901 is in a fixed position above the conveyor system 904. In some embodiments, the dimensioner device 901 can be tuned according to a known distance from the dimensioner device 901 to a bottom surface (e.g., the conveyor system 904). In this regard, by imaging two or three sides of the objects 908-1, 908-2, 908-3, the dimensioner device 901 may determine volumetric dimensions of the objects.

Illustratively, in accordance with various embodiments describe herein, for capturing the image frames of the objects, the dimensioner device 901 and/or the objects 908-1, 908-2, 908-3 (and so on) may be moved for capturing the image frames from different viewpoints. In this regard, the dimensioner device 901 may be coupled to movement devices (e.g., actuators, motors, turn-tables, flippers, pushers, robotic arms, etc.) that adjust a spatial relationship between the dimensioner device 901 and the objects 908-1, 908-2, 908-3 (and so on). In this regard, in accordance with various embodiments described herein, the dimensioner device 901 may provide notifications indicative of error in object dimensioning. The notifications, in this aspect, may be provided based on a detection of change in a configuration of the object, for instance, but not limited to, a usual shape or standard dimensions for a type of the object that is being dimensioned by the dimensioning system, while capturing the multiple image frames. The notifications, according to some embodiments, may be in form of at least one of a text message, a voice based instruction, and/or a haptic feedback, provided via various components coupled to the peripheral interface 513 of the dimensioning device 501.

Figure 10:
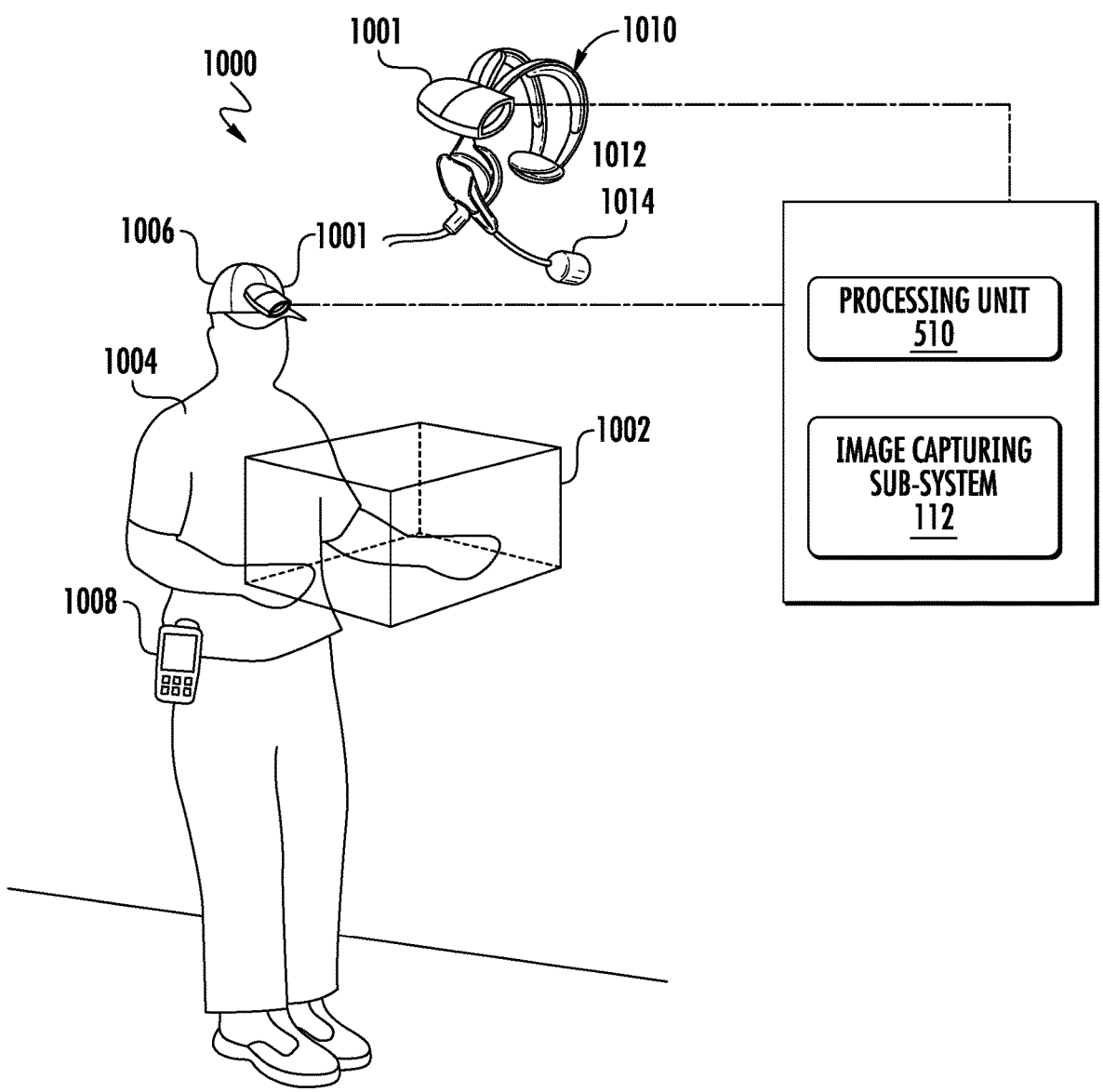
FIG. 10 illustrates a wearable dimensioning system adapted to compute dimensions of an object using range images, in accordance with some example embodiments described herein.

FIG. 10 illustrates a wearable dimensioning system 1000 adapted to compute dimensions of an object 1002 using range images in accordance with some example embodiments described herein. In this regard, as illustrated in FIG. 10, when a user 1004 wears the headgear 1006 that may be equipped with a dimensioner device 1001 (such as the device 501 of FIG. 5), the user 1004 may utilize the dimensioner device 1001, essentially hands-free, to make different types of dimensioning measurements of the object 1002. In this implementation, the user 1004 holds the object 1002, such as a shipment package to be measured while standing on ground. As illustrated, the user 1004 may also wear a portable control unit 1008 or an electronic device, such as a personal digital terminal (PDT) including a keypad, buttons, switches, or other input mechanisms. Also, as mentioned above, the headgear 1006 may be configured as a headset that is responsive to voice commands, received on a headset 1010 which may be connected via a network to the portable control unit 1008 and to a remote server (not shown).

In an aspect, the portable control unit 1008 may include processing functionality to control the system in response to commands or signals from the user 1004. For example, some of the functionality may include turning the dimensioner device 1001 on or off, such as by pressing a button, or giving a voice command to turn on or turn off. Other functionality may include resetting the dimensioner device 1001 if necessary, or giving commands (such as by pressing a button or giving a voice command) for capturing plurality of image frames of the object 1002. Another function may include initiating a process, such as the method 600 for computing dimensions of the object 1002, in response to various user inputs or commands. Also, other commands to confirm a measurement, redo a measurement, scan a bar code, and other inputs may be entered as needed.

In accordance with some embodiments, after a command is received to start the dimensioning, the user 1004 picks up the object 1002. In this regard, the user 1004 may also turn his or her face toward the object 1002 such that dimensioner device 1001 may properly scan the object 1002 to determine dimensions. In this manner, the user 1004 may quickly and easily make multiple measurements at one time with the measuring devices that are incorporated into the headgear 1006 or the headset 1010 being worn by the user 1004. In other embodiments, the user 1004 may perform the dimensioning by placing the object 1002 at a pre-defined platform, such as a weigh scale placed on a dimensioning station in a material handling environment. For instance, if the user 1004 is unable to position his or her head or body such that the dimensioner device 1001 may view the entire object 1002 while the user 1004 is holding the object 1002, the user 1004 may need to place the object 1002 far enough away to allow the dimensioner device 1001 to properly scan the object 1002. By way of implementation of illustrated embodiment, the user 1004 does not need to carry packages to designated measuring stations or worry about the location of handheld dimensioners that may tend to get misplaced.

As illustrated, in some embodiments, the dimensioner device 1001 may be optionally mounted on a headset 1010. In this aspect, the headset 1010 may include one or more headphones 1012 and a microphone 1014. In accordance with some embodiments, the headphones 1012 may be used to provide the navigational commands to direct the user 1004 to plurality of locations, like locations A-E, as illustrated in FIG. 7 for capturing the image frames having one or more 3D points, such as, points P1, P2, etc. The dimensioner device 1001 may further be equipped with voice-recognition software, and the microphone 1014 of the headset 1010 may be used to receive voice commands or other audible input from the user 1004.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-Ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method comprising:
    receiving, by a processing unit of a dimensioning system, a plurality of image frames corresponding to an object from a plurality of locations, wherein the plurality of image frames comprise a reflection of a light pattern projected on the object and image offsets indicating changes in a range of the object detected from the plurality of locations, and wherein two or more image frames of the plurality of image frames are associated with at least two locations of the plurality of locations and satisfy a predefined criterion associated with a geometric feature on a surface of the object;
    retrieving, by the processing unit, a plurality of 3D point clouds from the plurality of image frames comprising the reflection of the projected light pattern and the image offsets, wherein the plurality of 3D point clouds comprises a plurality of 3D points;
    identifying, by the processing unit, at least one pair of 3D points from the plurality of 3D points, wherein each 3D point of the at least one pair of 3D points corresponds to the geometric feature on the surface of the object;
    estimating, by the processing unit, a correspondence score indicative of a correspondence between features of the at least one pair of 3D points based upon one or more movement parameters corresponding to at least one of displacement or angular orientation associated with the dimensioning system;
    registering, by the processing unit, coordinates corresponding to each 3D point of the at least one pair of 3D points based upon the correspondence score; and
    computing, by the processing unit, dimensions of the object based at least in part upon the registered coordinates of each 3D point of the at least one pair of the 3D points and the plurality of 3D point clouds retrieved from the plurality of image frames.

2. The method of claim 1, wherein the at least one pair of 3D points comprises 3D points from at least two 3D point clouds of the plurality of 3D point clouds, wherein the at least two 3D point clouds are associated with the two or more image frames.

3. The method of claim 1, wherein the geometric feature comprises at least one edge of the object for which at least two surfaces of the object are mutually orthogonal, wherein the two or more image frames satisfy the predefined criterion by having the at least one edge on their corresponding image frames.

4. The method of claim 1, wherein the one or more movement parameters comprise one or more distances travelled by a camera unit and/or the object for capturing the plurality of image frames.

5. The method of claim 1, wherein the one or more movement parameters comprise one or more angular orientation parameters identified from each 3D point from the plurality of 3D points, wherein the one or more angular orientation parameters comprise at least one of a pitch, a yaw, or a roll of a camera unit for capturing the plurality of image frames.

6. The method of claim 1, wherein the computing the dimensions of the object comprises:
    retrieving, by the processing unit, coordinates of a reference plane utilized by the dimensioning system for capturing the plurality of image frames including the set of 3D points at the plurality of locations; and
    computing, by the processing unit, the dimensions of the object based upon the registered coordinates of the each of the identified at least one pair of the 3D point and the retrieved coordinates of the reference plane.

7. The method of claim 1, further comprising determining the plurality of image frames from a video feed associated with the object.

8. The method of claim 7, wherein determining the plurality of image frames further comprises identifying the two or more image frames associated with the at least two locations from the video feed.

9. The method of claim 8, further comprising:
    determining at least one location based on the two or more identified image frames; and
    subsequent to determining the at least one location and prior to retrieving the plurality of 3D point clouds, generating navigational commands directing to the at least one location.

10. The method as claimed in claim 9, wherein determining the at least one location from the two or more image frames comprises identifying at least one movement parameter associated with the dimensioning system from the two or more image frames.

11. The method of claim 9, wherein the navigational commands are in form of at least one of a text message, a voice based instruction, and/or a haptic feedback.

12. The method of claim 1, further comprising: providing notifications indicative of error in object dimensions based on a detection of change in a configuration of the object while capturing the multiple image frames that is being dimensioned by the dimensioning system, wherein the notifications are in form of at least one of a text message, a voice based instruction, and/or a haptic feedback.

13. A system for determining dimensions of an object, the system comprising:
    a camera unit configured to capture a plurality of image frames of the object from a plurality of locations, wherein the captured plurality of image frames comprise a reflection of a light pattern projected on the object and image offsets indicating changes in a range of the object detected from the plurality of locations, and wherein two or more image frames of the plurality of image frames are associated with at least two locations of the plurality of locations and satisfy a predefined criterion associated with a geometric feature on a surface of the object;

a processing unit in electronic communication with the camera unit, wherein the processing unit is configured to:

receive, from the camera unit, the plurality of image frames comprising the reflection of the light pattern projected on the object and the image offsets;

retrieve a plurality of 3D point clouds from the plurality of image frames comprising the reflection of the projected light pattern and the image offsets, wherein the plurality of 3D point clouds comprises a plurality of 3D points;

identify at least one pair of 3D points from the plurality of 3D points, wherein each 3D point of the at least one pair of 3D points corresponds to the geometric feature on the surface of the object;

estimate a correspondence score indicative of a correspondence between features of the at least one pair of 3D points based upon one or more movement parameters corresponding to at least one of displacement or angular orientation associated with the camera unit;

register coordinates corresponding to each 3D point of the at least one pair of 3D points based upon the correspondence score; and compute dimensions of the object based at least in part upon the registered coordinates of each 3D point of the at least one pair of the 3D point and the plurality of 3D point clouds retrieved from the plurality of image frames.

14. The system of claim 13, wherein the at least one pair of 3D points comprises 3D points from at least two 3D point clouds of the plurality of 3D point clouds, wherein the at least two 3D point clouds are associated with the two or more image frames.

15. The system of claim 13, wherein the geometric feature comprises at least one edge of the object for which at least two surfaces of the object are mutually orthogonal, wherein the two or more image frames satisfy the predefined criterion by having the at least one edge on their corresponding image frames.

16. The system of claim 13, wherein the one or more movement parameters comprise at least one of: (a) one or more distances travelled by the camera unit for capturing the plurality of image frames; or (b) one or more angular orientation parameters identified from each 3D point from the plurality of 3D points, wherein the one or more angular orientation parameters comprise at least one of a pitch, a yaw, or a roll of the camera unit for capturing the plurality of image frames.

17. The system of claim 13, wherein the plurality of image frames corresponds to a video feed captured by the camera unit, and wherein the processing unit is further adapted to:

determine the two or more image frames from the video feed;

identify at least one movement parameter associated with the camera unit from the two or more image frames; and determine at least one location based on the at least one movement parameter.

18. The system of claim 17, wherein the processing unit is further adapted to:

subsequent to determining at least one location and prior to retrieving the plurality of 3D point clouds, generating navigational commands directing to the at least one location.

19. The system of claim 18, wherein the navigational commands are in form of at least one of a text message, a voice based instruction, and/or a haptic feedback.

20. An apparatus for computing dimensions of an object using a plurality of image frames, the apparatus comprising at least one processor and at least one non-transitory memory including program code, the at least one non-transitory memory and the program code configured to, with the at least one processor, cause the apparatus to at least:

receive the plurality of image frames corresponding to the object from a plurality of locations, wherein the received plurality of image frames comprise a reflection of a light pattern projected on the object and image offsets indicating changes in a range of the object detected from the plurality of locations, and wherein two or more image frames of the plurality of image frames are associated with at least two locations of the plurality of locations and satisfy a predefined criterion associated with a geometric feature on a surface of the object;

retrieve a plurality of 3D point clouds from the plurality of image frames comprising the reflection of the projected light pattern and the image offsets, wherein the plurality of 3D point clouds comprises a plurality of 3D points;

identify at least one pair of 3D points from the plurality of 3D points, wherein each 3D point of the at least one pair of 3D points corresponds to the geometric feature on a surface of the object;

estimate a correspondence score indicative of a correspondence between features of the at least one pair of 3D points based upon one or more movement parameters corresponding to at least one of displacement or angular orientation associated with a camera unit for capturing the plurality of image frames;

register coordinates corresponding to each 3D point of the at least one pair of 3D points based upon the correspondence score; and compute dimensions of the object based at least in part upon the registered coordinates of each 3D point of the at least one pair of the 3D point and the plurality of 3D point clouds retrieved from the plurality of image frames.

* * * * *